United States Patent [19]

Crane et al.

[11] Patent Number: 4,501,467

[45] Date of Patent: Feb. 26, 1985

[54] SCANNING SYSTEM EMPLOYING A LASER BEAM

[75] Inventors: Joseph J. Crane, Woodbridge; Daniel T. Beasley, Springfield, both of Va.

[73] Assignee: Crosfield Data Systems, Inc., Springfield, Va.

[21] Appl. No.: 383,930

[22] Filed: Jun. 2, 1982

[51] Int. Cl.³ .............................................. G02B 27/17
[52] U.S. Cl. ..................................................... 350/6.1
[58] Field of Search ........................................ 350/6.1

[56] References Cited

U.S. PATENT DOCUMENTS 3,030,744  4/1962  Mueller.
3,938,191  2/1976  Jarmy.
4,131,916  12/1978  Landsman.
4,139,243  2/1979  Landsman.

OTHER PUBLICATIONS

Catalog sheet describing Fairchild Model T5100 series I/P and E/P Transducers.
Catalog sheet for M83 Seires Motor/Driver produced by Compumotor Corporation, 1310 Ross Street, Petaluma, CA 94952.
Catalog sheets for Air Bearing Slides known as Pneumo-Linear slides, manufactured by Pneumo Precision, Inc., Precision Park, Kenne, N.H. 03431.
Dover Air Bearings, Dover Instrument Corp., P.O. Box 100, 5 Walkup Drive, Westboro, Mass. 01581
Dover Bulletin #580, Dover Instrument Corp., P.O. Box 100, 5 Walkup Drive, Westboro, Mass. 01581.

Primary Examiner—John K. Corbin
Assistant Examiner—Rebecca D. Gass
Attorney, Agent, or Firm—William D. Hall

[57] ABSTRACT

A scanning system using at least one mirror for scanning material to read (or alternatively to be written upon) with a laser beam is provided. Air under pressure is fed into a hollow shaft and escapes through a turbine on the shaft to rotate the shaft. The shaft is supported by air bearings. The shaft rotates the mirror during scanning. Air pressure escaping from the air bearings is vented to the ambient atmosphere. Two special thrust bearings are provided to improve the stability of the shaft. Each thrust bearing applies a force on the shaft in a direction parallel to the axis of the shaft and opposite to the force applied by the other thrust bearing. Each thrust bearing comprises a cavity in the housing, a flat plate attached to the shaft, and a porous bronze plate between the cavity and the flat plate. The air pressures in the two cavities are separately adjustable to enable the operator to select pressures that provide the system with maximum stability. The air under pressure in each cavity passes through the porous bronze plate associated with the cavity to apply pressure to the flat plate (that is attached to the shaft) associated with the cavity.

13 Claims, 6 Drawing Figures

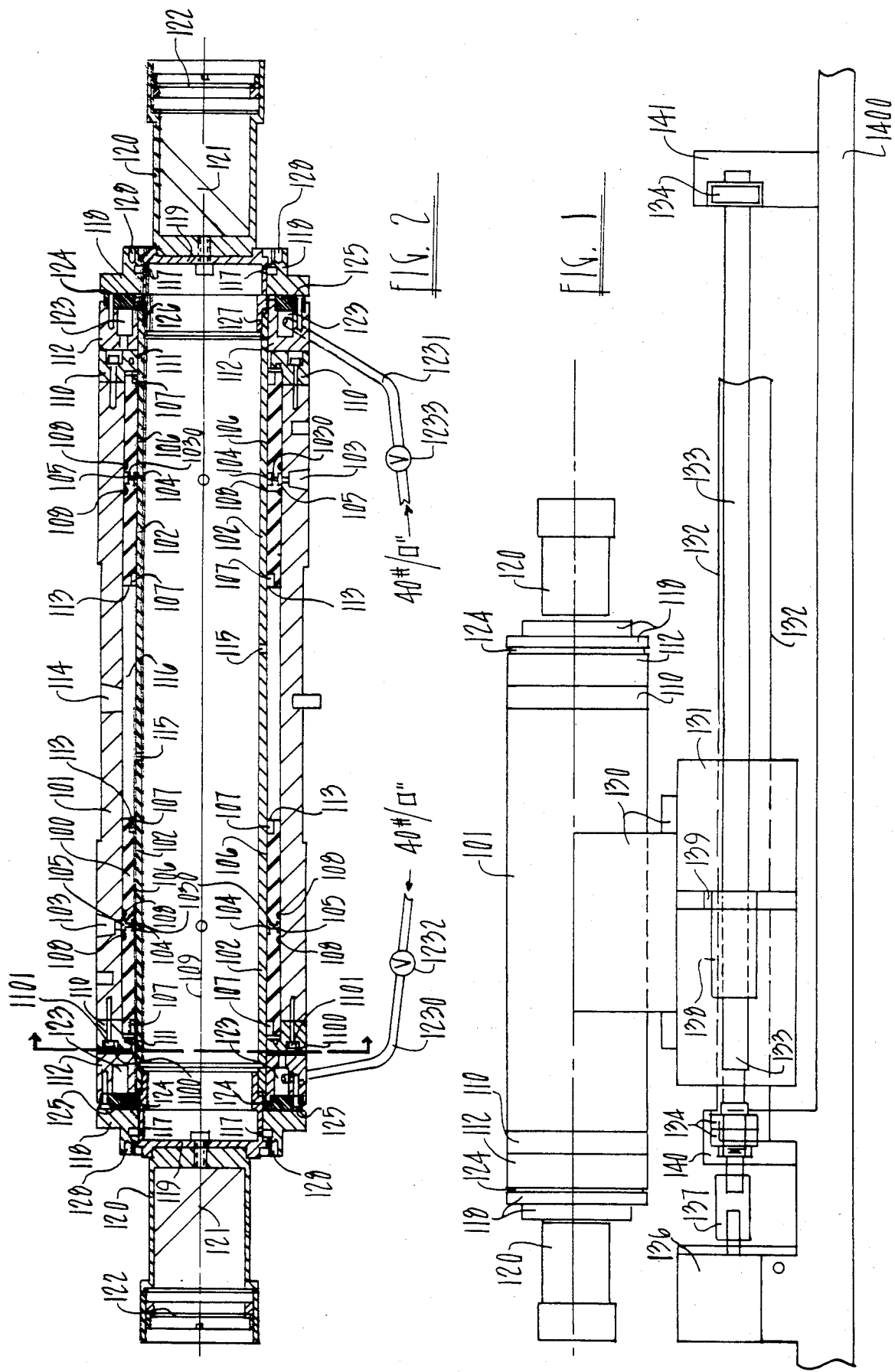

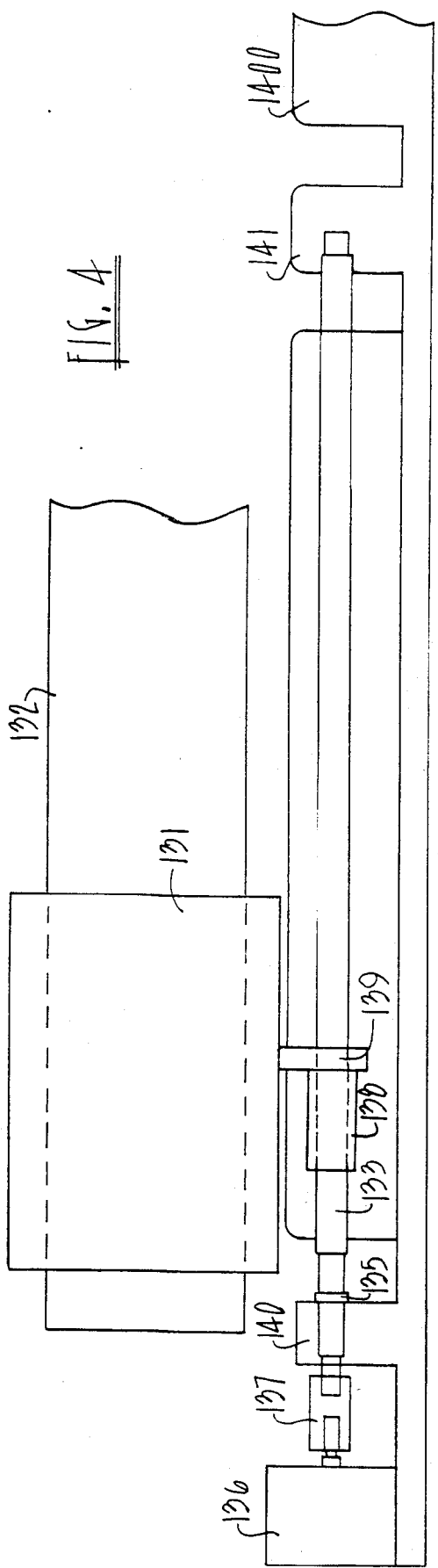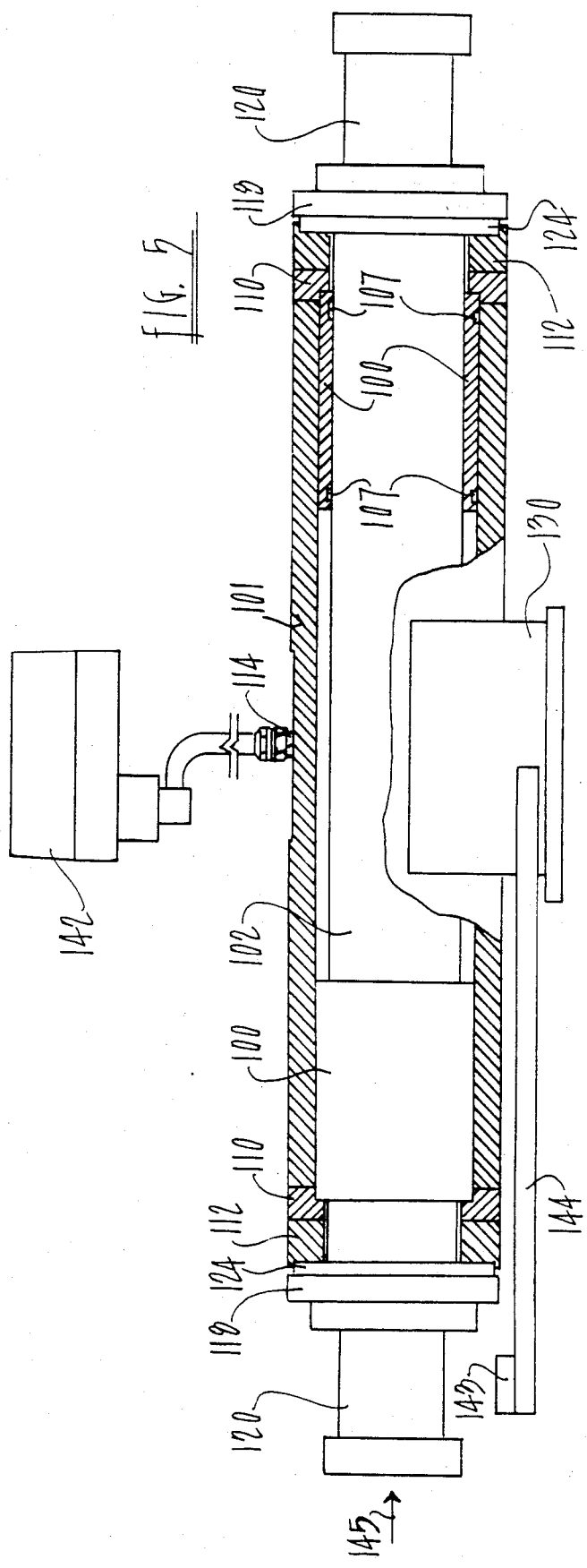

SCANNING SYSTEM EMPLOYING A LASER BEAM

TECHNICAL FIELD

This invention relates to scanning systems employing a laser beam; and is particulary useful in connection with scanning systems for reading and/or writing with laser beams in connection with the making of printing plates. For example, one application of the invention would be reading a paste-up representing a page of a newspaper. Another application is the making of printing plates. Similarly, laser masks may be made from which a multiplicity of printing plates may be made.

BACKGROUND ART

Scanning systems using laser beams for reading and/or writing are well known. For example, U.S. Pat. No. 4,131,916 to Robert H. Landsman, which issued Dec. 26, 1981, entitled Pneumatically Actuated Image Scanning Reader/Writer, shows a pair of mirrors mounted at opposite ends of a rotating shaft. The shaft is hollow, is mounted on air bearings, and is rotated by air that is fed into the hollow portion of the shaft and is exhausted through inclined portholes in the rotating shaft. The discharge of air through these inclined portholes rotates the shaft. The scanning action of Landsman involved both rotation and translation of the shaft. To effect translation, the said Landsman patent employed a differential air pressure system as a part of the rotating shaft.

DISCLOSURE OF INVENTION

In accordance with the present invention, there is also a hollow rotating shaft. Air under pressure is fed into the cavity in the shaft and escapes through one or more turbines to rotate the shaft. To improve the horizontal stability, an annular cavity is provided near each of the opposite ends of the shaft. Contiguous with each such cavity is a porous bronze plate, one face of which is fed with air under pressure from its nearby cavity. The opposite face of the porous bronze plate is substantially contiguous with a flat plate which may be a part of one of said turbines. Thus, the air flow from each cavity is toward the end of the shaft and is parallel to the axis of the shaft. That air flow, at each end of the device, is through the bronze plate and into said flat plate. The air pressure in each cavity is separately controlled, and is adjusted with reference to the air pressure in the other cavity to achieve maximum stability.

BRIEF DESCRIPTION OF THE DRAWINGS

FIG. 1 is a side view of the invention.

FIG. 2 is a cross-section of the rotating scanning element and the stationary housing therefor.

FIG. 4 is a top view of the apparatus for translating the rotating scanning element.

FIG. 5 is a side view of the rotating system with a portion being a cross-sectional view.

BEST MODE FOR CARRYING OUT THE INVENTION

Figure 3:
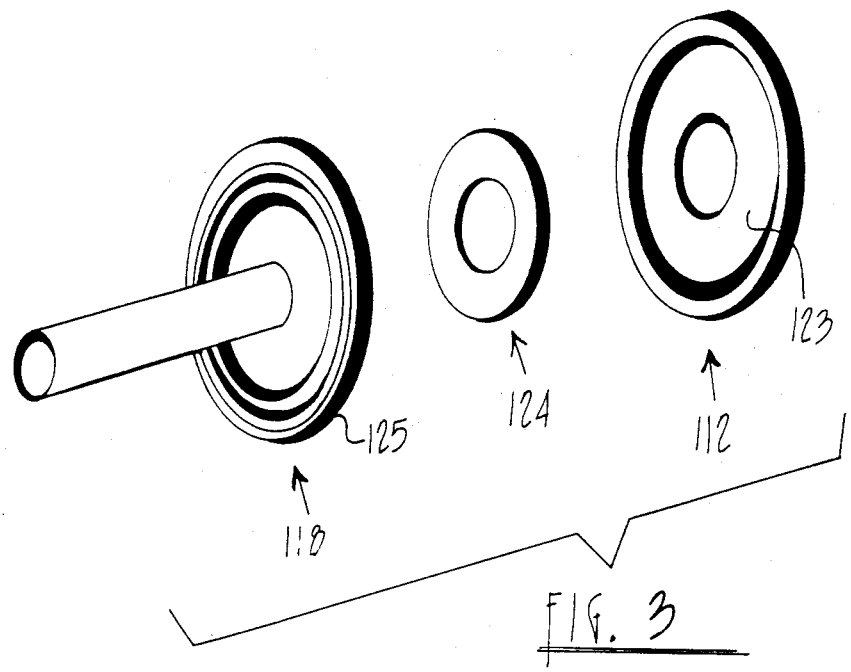
FIG. 3 is a detail view of a portion (112) of the housing, a porous bronze plate (124), and the turbine (118) having a flat sidewall (125).

The present invention is an improvement upon the scanning system of said Landsman U.S. Pat. No. 4,131,916; and the present invention simply provides improved apparatus for rotating the scanning mirrors.

The bearing (100) is supported by the housing (101) which, as will be seen, moves laterally and parallel to the material to be scanned, but does not rotate about the axis (109) of FIG. 2. The shaft (102) rotates with reference to the bearing (100) and the housing (101) around the axis (109). Air under pressure between 70 and 100 pounds per square inch is connected to input (103) and enters annular slot (105) which completely encircles the outer portion of bearing (100). The air under pressure from slot (105) enters annular trough (104) to thus provide an air bearing surface between the rotating shaft (102) and the bearing (100). This air space (106), between bearing (100) and shaft (102), is approximately 0.0008 inches wide. The O rings (108) prevent leaking of the air passing inlet (103) to the annular groove (104). The cap (110) is connected to the housing (101) and has a vent (111) which feeds hole (1110) (FIG. 6) whereby air which flows past ring (107) is vented to the atmosphere. Some air from space (106) also passes ring (107) to space (113) which is at lower pressure, as will be seen, than the pressure in the gap between ring (107) and shaft (102).

Air under pressure from a servo mechanism that controls the air pressure (see part 142 in FIG. 5) enters inlet (114) and then via space (116) to air ports (115) and then through the ports (117) to drive the turbines (118). The turbines (118) rotate the endplates (119) which, in turn, rotate optical housings (120) which respectively carry the mirrors (121) and the lens (122). Both mirrors (121) and both lenses (122) therefore rotate at the same speed as the turbines (118). The air flows through the space (106) between the bearing (100) and shaft (102) and exits the bearing through the gap provided by rings (107) which are of cylindrical shape and are preferably made of a material known as Vespel, manufactured by DuPont. The gaps between the rings (107) and shaft (102) are typically between 0.0001 and 0.0004 inches.

Air under pressure at about 40 pounds per square inch is also fed into the annular groove (123) from which air under pressure flows through the bronze porous plate (124) and applies pressure to the flat inner surface (125) of the turbine (118). An air gap of approximately 0.002 to 0.005 inches is provided between the porous plate (124) and the flat plate which comprises the inner end surface (125) of the tubine (118).

Heretofore, devices with rotary air bearings have been used, not only in connection with scanning devices of the general class involved here, but also in other applications. One problem that has arisen in connection with such air bearings is that there is unwanted lateral movement between the housing and the rotating part. Such unwanted lateral movement is very objectionable in the case of a scanning device of the character involved here because any lateral error in the position of the mirrors (121) will cause an error in the materials being read and/or printed, as the case may be. This lateral movement which causes such error is avoided, by reason of the porous bronze block (124) at both ends of the device. Air under pressure enters the annular cavities (123), both at the right end of the device via feed line (1230) and at the left end of the device via feed line (1231), and passes through the porous bronze plates (124) and applies pressures on the flat surfaces (125) of the turbines (118) (see FIG. 3).

With reference to FIG. 2, the air under pressure to cavity (123) on the left side of the machine is preferably separately regulated from the air pressure entering cavity (123) on the right hand side of the machine, and if this is not done, instability may result. By trial and error, the correct pressures for the two cavities (123) are selected using two pressure regulators (1232) and (1233) (FIG. 2). The two pressures are adjusted to achieve maximum stability.

The end plate (119) is attached to the shaft (102) by threads. The inner surface of shaft (102) is threaded along surface (126) and the outer surface of the ring (127) attached to end plate (119) is threaded. The mating threads between the inner surface of shaft (102) and the outer surface (127), hold the end plate (119) to the shaft (102).

The current-pressure transducer (142) may be Fairchild Series T5100 manufactured by Fairchild Industrial Products Division, 1501 Fairchild Drive, Winston Salem, N.C. (FIG. 5). Preferably this apparatus is catalog number T5120-1, having an input impedance of 2,340 ohms and an input range 1 to 5 milliamperes. This transducer controls the air pressure to inlet (114) and holds that pressure at approximately 40 pounds per square inch as previously explained.

Tapped holes, such as (128), may be placed in the ends of plates (119). Set screws may be inserted (or omitted) in these holes. The size and placement of the set screws may be selected to precisely balance the rotating mechanism dynamically.

FIG. 3 is an exploded view of the details of the manifold (112), the bronze porous plate (124) and the end plate (125) of the turbine (118).

Figure 6:
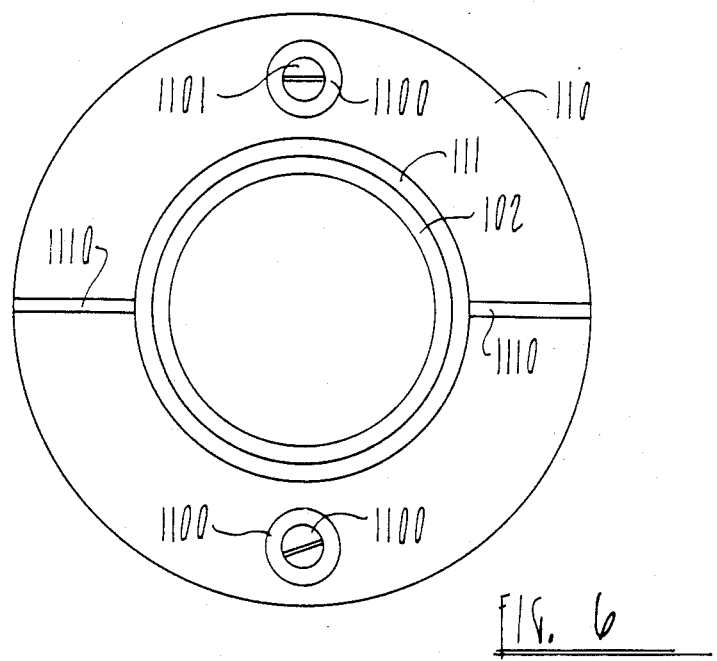
FIG. 6 is a cross-sectional view along line 6—6 of FIG. 2.

FIG. 6 illustrates certain details of caps (110) (FIG. 2). There are two of these caps (110), one at each end of the rotating apparatus of FIG. 2. While only the details of the left cap (110) are shown in FIG. 6, it is understood that the right hand cap (110) (FIG. 2) has similar details. The cap (110) has a borehole (1100) through which bolt (1101) passes to fasten the cap (110) securely to housing (101).

One desirable feature shown in FIG. 6 is that there are air bleed holes (1110) extending from vent (111) to the abmient atmosphere to thus allow a release of the air under pressure that passed the outermost rings (107) into vent (111).

FIG. 1 shows the supporting mechanism for the apparatus shown in FIG. 2 and also moves the apparatus shown in FIG. 2 laterally for the purpose of providing the lateral component of the scanning motion. The scanning motion obviously has, in addition to the lateral movement, a rotating movement which has already been described. The housing (101) originally explained in connection with FIG. 2 and which is also shown in FIG. 1 is supported by the cradle (130). The cradle (130) is mounted on the pneumo-linear slide (131). This slide (131) is manufactured by Pneumo Precision, Inc., Precision Park, Keene, N.H.; and, together with its supporting rail (132), is an established and well known supporting element. The slide (131) is supported by air pressure from the railing (132) which is also manufactured by said Pneumo Precision, Inc., as aforesaid.

In other words, the stationary rail (132) supports the slide (131), and the support function between (131) and (132) is by means of air pressure. The slide (131), in turn, supports the cradle (130) which, in turn, supports the housing (101).

Running parallel to, and along side of, the supporting element (131), and the rail (132), is a lead screw (133) which is supported by three bearings (134) and which is prevented from unwanted lateral movement by collar (135). The lead screw (133) is rotated by stepping motor (136) which is connected to the lead screw (133) by the coupler (137).

The stepping motor (136) (FIG. 3) may be model M83-62 series, motor/driver, manufactured by Compumotor Corporation, 1310 Ross Street, Petaluma, Calif. This stepping motor (136) has 25,000 steps per revolution, and a preferred speed of approximately 1 revolution per second when driving a 10 pitch lead screw. Using a 10 pitch lead screw (133), the apparatus of FIG. 2 scans approximately 1,000 lines per inch during reading and/or writing. Following the scanning of a complete page, the stepping motor runs in reverse at a speed of approximately 6 revolutions per second in order to return the apparatus of FIG. 2 to its starting position for a new scan.

The preferred speed for the turbine (118) is 6,000 rpm whereby the mirrors rotate at that speed during scanning.

FIG. 4 is a top view of FIG. 1. In FIG. 4, the stepping motor (136) drives the coupler (137) which, in turn, drives the lead screw (133) which cooperates with the lead screw nut (138) (FIG. 1) which is held in fixed relation to the apparatus of FIG. 2 by bracket (139). The lead screw bearings are supported by support blocks (140) and (141). The bracket (139) is firmly attached to the support (131) which is carried by the rail (132) by air pressure as explained heretofore. The apparatus of FIGS. 1 and 4 rests on base (1400).

FIG. 5 is another view of the device of FIG. 2 showing certain additional details. A laser beam (145) is shown entering the left end of the apparatus where it is focused on the material to be read by the lens (122) via the mirror (121). As the mirror rotates about the axis (109) (FIG. 2), the laser beam is reflected to provide scanning. This beam intermittently and periodically passes encoding device (143) which emits one signal pulse for each revolution of the mirror (121). The pulses may be used for counting, synchronizing or the like. The encoding apparatus (143) is supported by bracket (144) from the cradle (130) which is more fully shown and explained in connection with FIG. 1.

The foregoing apparatus, therefore, provides means for both rotating and translating the scanning mirrors (121) to provide a desired scanning operation.

We claim to have invented:

1. In a scanning system of the type have (a) a hollow housing; (b) a shaft in and supported by said housing; (c) scanning means carried by said shaft; and (d) means for rotating said shaft, said shaft having a first and a second end;

the improvement comprising:
means for improving the lateral stability of said shaft, comprising all of the following:
said housing defining a first and second spaced cavities, said cavities being spaced apart from each other
air pressure supply means for supplying air under pressure to said cavities,
said shaft including as part thereof and affixed thereto a first member located between the first cavity and said first end of said shaft, and a second member located between the second cavity and said second end of said shaft, first element means located between said first cavity and said first member, said first element means for allowing a restricted air flow from said first cavity to pass to and apply pressure upon said first member, and a second element means located between the second cavity and said second member, said second element means for allowing a restricted airflow from said second cavity to pass to and apply pressure upon said second member.

2. In a scanning system as defined in claim 1, an air bearing for supporting said shaft from said housing, said housing having at least one vent hole for releasing to the ambient atmosphere, air which escapes from said air bearing.

3. In a scanning system as defined in claim 1, adjustable control means associated with said air pressure supply means for regulating the relative pressures in said two cavities to thus enable the operator to select air pressures that provide lateral stability of the shaft.

4. In a scanning system as defined in claim 1, air bearing means inside the housing having air under pressure for supporting said shaft in said housing, some of such air under pressure escaping from the air bearing means to the inside of the housing, a vent hole for releasing at least part of the air escaping from said air bearing means to the ambient atmosphere, said first and second members comprising flat surfaces adjacent said first and second ends of the shaft respectively, said flat surfaces being perpendicular to the axis of the shaft, two turbine means for rotating the shaft, each such turbine means including one of said flat surfaces, each turbine means defining air outlets from the inside of said shaft to the ambient atmosphere for rotating said shaft, said first element means comprising a first porous bronze plate, said first porous bronze plate being located between said first cavity and said first flat plate, said second element means comprising a second porous bronze plate, said second porous bronze plate being located between said second cavity and said second flat plate, whereby said first porous bronze plate applies air pressure from the first cavity to said first flat plate and said second porous bronze plate applies air pressure from said second cavity to said second flat plate.

5. In a scanning system as defined in claim 1, said first and second elements comprising a first and a second porous plates respectively.

6. In a scanning system as defined in claim 5, said first and said second porous plates having a flat surface, said first and second members comprising flat surfaces, where the flat surface of said first porous plate is substantially contiguous with said flat surface of said first member and said flat surface of said second porous plate is substantially contiguous with said flat surface of said second member.

7. In a scanning system as defined in claim 6 in which said first and second porous plates are porous bronze plates.

8. In a scanning system as defined in claim 6, in which said air pressure supply means includes means for varying the relative air pressures in said cavities, to thereby enable air pressures to be applied to said cavities that improve lateral stability of the shaft to be selected.

9. In a scanning system as defined in claim 8, said first and second porous plates being respectively located adjacent to said first and second ends which are oppositely disposed on the shaft.

10. In a scanning system as defined in claim 1, said first and second members having a flat surface perpendicular to the axis of the shaft, said first and second members being adjacent to said first and second element means respectively and said first and second elements being fed with air under pressure by said first and second cavities respectively.

11. In a scanning system as defined in claim 10, said first element means comprising a porous bronze plate interposed between said first cavity and said flat surface of said first member and said second element means comprising a porous bronze plate interposed between said second cavity and said flat surface of said second member.

12. In a scanning system as defined in claim 1, said shaft being hollow and having a turbine attached to the shaft, the hollow cavity in the shaft being fed with air under pressure which escapes through said turbine to rotate the shaft, said turbine including one of said members in the form of a flat plate to which air pressure is applied by virtue of the air under pressure flowing from said first and second cavities through said first and second element means impinging on said flat plate.

13. In a scanning system as defined in claim 12, said first and second element means being porous bronze plates.

* * * * *